United States Patent Office 2,938,128
Patented May 24, 1960

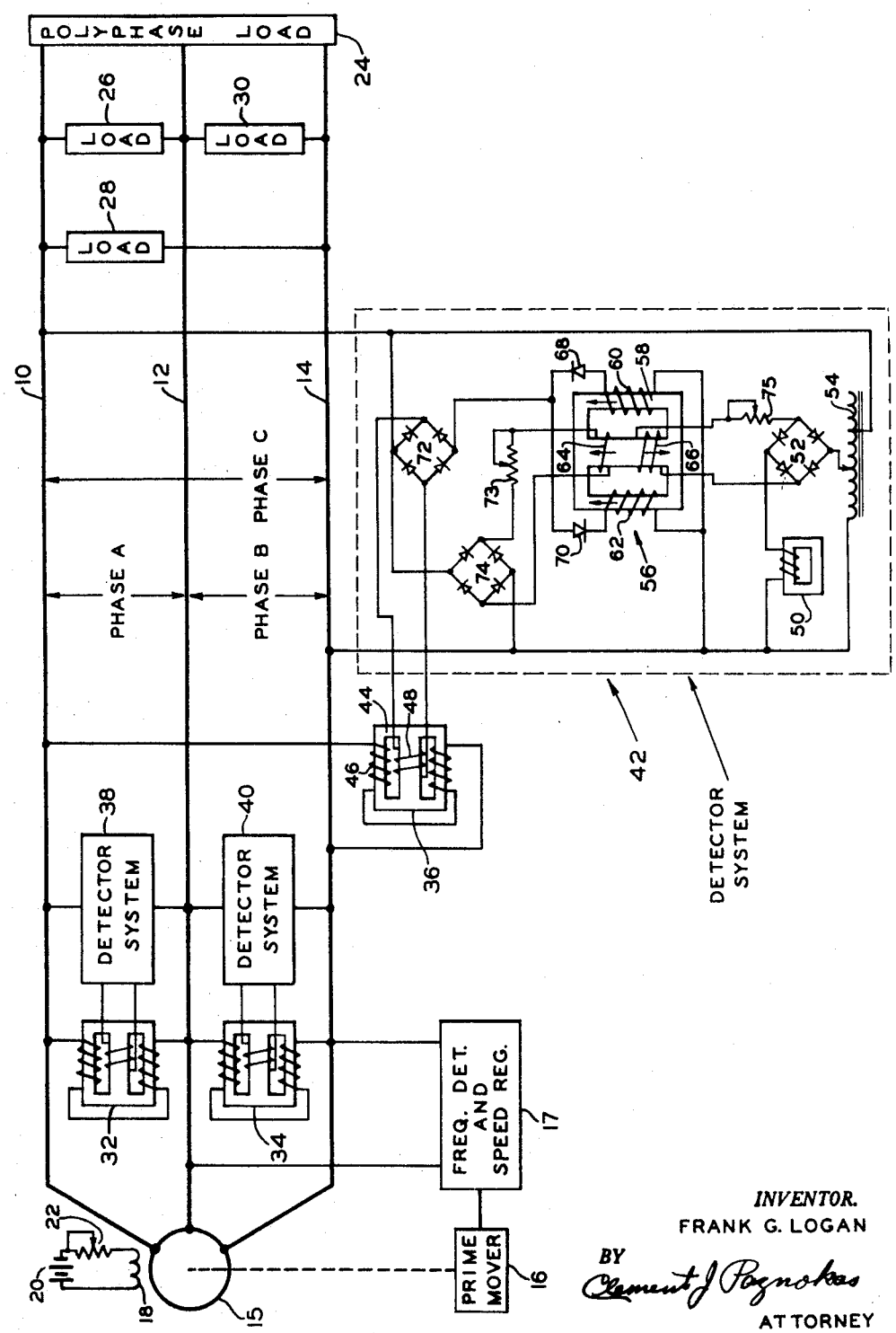
May 24, 1960     F. G. LOGAN     2,938,128
POLYPHASE GENERATOR POWER TRANSMISSION
Filed Feb. 7, 1955
*INVENTOR.*
FRANK G. LOGAN
BY
ATTORNEY

2,938,128

POLYPHASE GENERATOR POWER TRANSMISSION

Frank G. Logan, Glendale, Mo., assignor to Vickers, Incorporated, Detroit, Mich., a corporation of Michigan Filed Feb. 7, 1955, Ser. No. 486,403

3 Claims. (Cl. 307—14)

This invention relates to power transmission and more particularly to voltage regulation of synchronous generator systems under unbalanced load conditions.

The usual method of controlling the terminal voltage of a synchronous generator under various conditions of operation is to modify the field current of the machine, either manually or automatically, to maintain the desired terminal voltage. Automatic generator voltage regulators using field control of polyphase machines are arranged either to regulate to the voltage of one selected phase, or to regulate to the average of the phase voltages.

If the generator phases are loaded equally, either of the above methods is satisfactory and the phase voltages will be the same under all other conditions of operation.

However, if single phase detection is used and unbalanced loads are imposed on the generator, serious phase voltage unbalance is possible. If, for example, a regulator is arranged to regulate to the voltage of phase A of a three-phase machine and only phase A is loaded, voltages of the other two phases will rise to values determined by the machine characteristics. Conversely, if no load is imposed on A and either or both of the other phases are loaded, the voltages of the loaded but unregulated phases can drop substantially.

A partial answer to this problem is the method of regulating the generator output to the average of the phase voltages. This has the advantage of reducing the magnitude of the phase voltage excursions from the nominal value of regulated voltage. However, the total voltage difference between phases remains about the same as that found using the single phase detection method.

For many applications, regulating polyphase generator voltages to the average of the phase voltages is acceptable. Generally speaking, loads are either polyphase or, if some single phase loads are found with a polyphase load, they can be so distributed around the phases that voltage unbalance between phases is minor and has no significant effect upon the connected equipment. A central station supplying mixed industrial and residential loads is typical of this mode of operation.

If, however, the character of the connected loads on a generator are such that fairly large unbalanced phase loadings is experienced and, further, if the proper operation of these loads is adversely affected by voltage differences between phases or by deviation of a phase voltage from a specific value, trouble can be caused by using either single phase detection or regulating to the average value of the phase voltages.

The frequency of a generator has a considerable bearing on the magnitude of phase voltage unbalance with unbalance with unbalanced phase loading. Voltage unbalance under this condition is likely to be more severe as generator frequency increases.

In accordance with one embodiment of the invention a desired relation between the voltages of the respective phases is maintained with substantial aid from armature reaction in a polyphase generator system under conditions of unbalanced phase loading by controllable shunt reactors connected across each of the phases, each reactor drawing sufficient lagging zero power factor current from the phase spanned by the reactor, in response to a condition of that phase, to compensate for voltage changes of that phase due to load changes. Substantial compensation is provided by the demagnetizing armature reaction in the generator created by the lagging current.

It is an object of the present invention to provide a novel polyphase generator system wherein a desired ratio between the voltages of the respective phases is maintained under conditions of unbalanced phase loads.

Another object of the invention is a polyphase generator system wherein a desired ratio between the voltages of the respective phases is maintained by drawing sufficient lagging reactive current from any phase in response to a condition of that phase to compensate for the voltage change of that phase due to load change of that phase.

Another object of the present invention is a polyphase generator system wherein a desired ratio between the voltages of the respective phases is maintained mainly by creating and controlling demagnetizing armature reaction.

A further object of the present invention is a polyphase generator system subject to unbalanced phase loads and wherein the phase voltages are regulated by controllable inductive reactors connected across the respective phases, the control means of each reactor being responsive to a condition of the particular phase it spans.

A further object of the present invention is a polyphase generator system subject to unbalanced phase loads and wherein the phase voltages are regulated by controllable inductive reactors connected across the respective phases, the control means of each reactor being responsive to the voltage across the phase spanned by the reactor.

Further objects and advantages of the present invention will be apparent from the following description, reference being had to the accompanying drawing which is a diagram of a preferred form of the present invention.

The apparatus shown in the drawing is a polyphase generator system including a plurality of bus bars 10, 12 and 14 connected to the respective phases of a three-phase A.C. synchronous generator 15 driven by a prime mover system 16, which may be speed or frequency regulated, for example by a frequency detector and speed regulator 17 connected to the generator buses and the prime mover system. The generator may have a star or delta connected armature. Field excitation for the generator is provided by a field winding 18 connected to a suitable source of current, such as an excitor or a battery 20, through an adjustable control 22. A three-phase load is shown at 24 and separate loads on the respective phases are indicated at 26, 28 and 30. It is well known that the main field flux of a synchronous generator is weakened by lagging zero power factor current flowing in the armature.

As a matter of convenience, the phase between buses 10 and 12 is referred to as phase A, that between buses 12 and 14, phase B, and between buses 10 and 14, phase C.

Each phase has its own voltage detector and, connected across the phase, an inductive reactor whose reactance is variable in response to the voltage detector of the phase spanned by the reactor. In the arrangement shown, the inductive reactance of the shunt reactor across a phase is inversely affected by the detector output, i.e., the reactance decreases in response to voltage rise across the phase and vice versa. The reactor across phase A is indicated at 32, that across phase B at 34, while the reactor across phase C is indicated at 36. The respective voltage detectors across each of phases A, B and C, together with individual amplifiers therefor may, for convenience, be referred to as detector systems and shown as indicated at 38, 40 and 42, respectively, each of the boxes representing a detector system and containing a detector and an associated amplifier as hereinafter described.

Shunt reactors 32, 34 and 36 being alike, only one, for example reactor 36, need be described in detail. The reactor 36 is a saturable reactor and includes a magnetizable core 44 which carries an output winding 46 connected across phase C of the system, and a saturating or control winding 48 provided with control current responsive to the voltage detector across phase C. The control winding of each reactor is connected to receive current in response to the output of the voltage detector across the phase spanned by the reactor. The detector systems 38, 40 and 42 being similar, only one, the system 42 enclosed in the dashed line box, is shown and described in detail.

Any suitable voltage sensing apparatus may be employed in each phase, for example a nonlinear device such as a saturating nonlinear reactor. In the detector system 42, the voltage detector is the reactor 50, connected effectively across phase C (between buses 10 and 14), through a rectifier 52 and an adjustable potential transformer 54. A potential transformer may or may not be desired, depending upon the voltages incurred and the characteristics of the components in the system. Due to its nonlinearity, the reactor 50 is sensitive to voltage changes and, when the operating range used is along the steep portion of the detector output characteristic, it produces a substantial increment of change in the current supplied to the rectifier 52 in response to a relatively small increment of change in voltage across the phase spanned by the detector. Any desirable operating range of the detector within which regulation may take place may be made to occur at any selected values of the voltage across phase C by adjusting the transformer 54. As a practical matter, the voltage supply to the detector is adjusted so that the output of the detector is within the selected operating range when the voltage across phase C is at the desired value that is to be maintained or regulated to.

The output of rectifier 52 is amplified by the amplifier portion of the system 42, and the output of the amplifier supplies the control winding 48 of the reactor 36 with current which increases in response to increases of the voltage of phase C, and which decreases when the voltage across phase C decreases.

Any suitable amplifier may be employed to amplify the output of rectifier 52, for example the magnetic amplifier shown, which is familiarly known as the self-saturating doubler magnetic amplifier. In brief, it includes a saturable reactor 56 having a magnetizable core 58 with a pair of load windings 60—62, a bias winding 64, and a control winding 66, the load windings 60—62 having in series therewith one-way valves 68 and 70, respectively, to subject the load windings to intermittent unidirectional current for self-saturation. Each of the load windings with its associated valve forms a branch of the amplifier, both branches being in parallel, and the rectifiers 68 and 70 being poled to conduct on opposite half cycles of the supply voltage. The rectifiers 68 and 70 are reversely related to provide an arrangement wherein the amplifier supplies alternating current to its immediate load, a bridge rectifier 72 whose input is in series with the parallel branches in a circuit connected across phase C, the supply source of the amplifier. Control winding 48 of the reactor 36 is connected to receive the output of rectifier 72, which is the output of the detector system 42.

Bias current is supplied to winding 64 through an adjustable resistance 73 from a rectifier 74 whose input is connected across phase C. The control winding 66 of the amplifier is connected to rectifier 52 through an adjustable resistor 75 to receive the rectified output of the detector 50, which is responsive to and reflects the voltage condition of phase C. Due to the winding relations of the amplifier and the current directions in the respective coils, the control winding magnetomotive forces aid the load winding magnetomotive forces, and the output of the amplifier increases with increase of of control current from rectifier 52. Conversely, decrease of control current decreases the amplifier output. In control current from rectifier 52. Conversely, decrease the drawing, the arrow under each winding of the amplifier indicates the relative direction of the magnetomotive force. The amplifier input and bias may be adjusted by resistors 75 and 73 so that the amplifier can be driven up or down by the detector output as the latter deviates up or down within the selected operating range in response to phase voltage changes, thereby to decrease the reactance of shunt reactor 36 in response to increase of voltage across phase C, and to increase the reactance of the shunt reactor in response to a drop in voltage across phase C.

From the preceding description it will be apparent that a voltage increase across phase C will increase the detector current supplied to the amplifier control winding 66 by the detector 50, thereby increasing the amplifier output current supplied to the control winding 48 of the shunt reactor 36. As a result the saturation level of the reactor core 44 is raised and the reactance of the output winding 46 is reduced causing it to draw more current. A reduction of voltage across phase C will have the opposite effects in the sequence of events. Detector output and amplifier output will decrease, resulting in less control current to control winding 48 and a consequent increase in the reactance of the reactor 36.

As hereinbefore stated, the detector systems 38 and 40 are substantially the same and operate the same as the detector system 42. Thus, each phase is provided with its own detector which controls the reactance of the reactor spanning the phase in response to the voltage of that phase.

In order to obtain maximum demagnetizing armature reaction and to avoid loading the polyphase system with true power, the reactors 32, 34 and 36 are designed to operate as near zero power factor as possible.

A particular three-phase example of the invention employs a generator with the following ratings: 400 cycles; 120 volts phase; 1.25 kw.; and .8 power factor. Each of the three shunt reactors was rated at approximately 720 va.

Consider now the system as a whole, and assume for example an initial condition where the loads 24, 26, 28 and 30 are balanced and correspond to rated load at rated power factor, and where the phase voltages are at the desired value and the shunt reactors are at or near their maximum reactance. If the load on any phase be reduced, the voltage across the phase rises above the desired value increasing the output of that phase's voltage detector This increases the amplifier output and the current to the control winding of the shunt reactor across that phase, thus reducing the reactance of the shunt reactor and causing it to draw lagging zero power factor current from the affected phase. Since lagging zero power factor current produces armature reaction in the generator that opposes the field and has a demagentizing effect, the voltage of the affected phase is lowered toward the desired value.

Although the major effect of armature reaction due to lagging zero power factor current through one phase of the generator is on the voltage of that phase, there is some phase interaction and the voltages across the other phases are affected slightly. However, all the regulators in the respective phases will cooperate until equilibrium is reached at the desired voltage values across the respective phases.

In addition to the effect on armature reaction the current through the reactor produces line drops and some drop in the generator windings. Although these voltage drops are generally much smaller than the voltage loss due to the demagnetizing armature reaction from a given value of zero power factor current, they are also a part of the regulatory effect of the reactor current.

In another operational example, assume that all of the phases are operating at a desired voltage value. When the load is increased in a phase, the voltage of that phase tends to drop, lowering the output of the detector and of the amplifier. This results in less current in the control coil 48 and lower saturation level of the reactor 36, and as a consequence, higher reactance of the output winding 46. Less current is drawn from the affected phase by the shunt reactor, weakening the demagnetizing armature reaction, and lessening the machine drops, all of which results in a rise of the voltage of that phase back toward the desired value.

Although generally it is desired to maintain balanced or equal phase voltages in spite of load unbalance, there are occasions when it is desired to regulate the separate phases to different voltage values and still preserve a particular relation between the respective phase voltages despite load unbalances and changes. This may be accomplished in this system by adjusting the amplifier bias or the potential transformer differently in each phase so that the respective detector systems detect around a different voltage level. Each phase thus can be regulated to its own desired and different voltage, and the desired ratio between the respective phase voltages will be maintained.

The shunt reactor in each phase should be capable of drawing sufficient zero power factor current to provide the armature reaction and machine drop necessary to compensate for the voltage change due to the greatest anticipated reduction and unbalance of load on the machine. Theoretically with ideal machines and components, a shunt reactor having the kvar. rating of the generator would operate in the described embodiment to regulate as bad a load unbalance as the complete removal of the external load from one phase. Thus in theory, for the particular three-phase example mentioned with a 1.25 kw. .8 power factor rating, each shunt reactor could be $$\frac{(1.250)(.6)}{(.8)(3)} = .312 \text{ kvar.}$$

However, in practice because of nonideal conditions, such as line and machine drops, etc., the reactors will be somewhat larger. In the example mentioned the shunt reactors actually used were rated approximately 720 va. as against the theoretical minimum rating of 312 va. for ideal conditions. In any event to handle such an unbalance the shunt reactor across a phase should be capable, when saturated by control current, of drawing sufficient zero power factor current to cause the system to lower the voltage of the unloaded phase to the desired voltage value.

The following procedure may be used as a guide in determining the rating of the shunt reactor for each phase. An adjustable standard reactor is connected across each phase of the generator system, the reactors being adjusted for maximum reactance. Then the generator field current is adjusted to the value required to support the desired voltage at the maximum load and lowest power factor expected. The expected maximum load per phase at the lowest power factor expected is next applied to the machine, after which the load per phase is slowly reduced to the minimum expected in operation, while at the same time the reactors are adjusted to reduce their respective reactances sufficiently to bring the voltage to the desired value with minimum load on the machine. Under these conditions the currents drawn by the reactors will be indicative of the ratings required for shunt reactors to replace the standard reactors.

While the form of embodiment of the invention as herein disclosed constitutes a preferred form, it is to be understood that other forms might be adopted, all coming within the scope of the claims which follow.

What is claimed is as follows:

1. A polyphase electrical system comprising an A.C. generator having a plurality of output phases connected to loads and subject to load unbalance between phases, a plurality of circuits defining the respective output phases, and means employing mainly demagnetizing armature reaction for maintaining a desired ratio between the voltages of the respective phases under unbalanced load conditions, said means comprising means in the circuit of each phase and responsive to the voltage across that phase for drawing lagging substantially zero power factor current from that phase to compensate for voltage changes of that phase, the last said means comprising an individual detector in each phase for detecting voltage changes across that phase, a controllable reactor in each phase having an output winding shunted across that phase, and a control element in each phase for controlling the reactance of the reactor output winding in response to the detector in the phase shunted by that output winding.

2. A polyphase electrical system comprising an A.C. generator having a plurality of output phases connected to loads and subject to load unbalance between phases, a plurality of circuits defining the respective output phases, and means employing mainly demagnetizing armature reaction for maintaining a desired ratio between the voltages of the respective phases under unbalanced load conditions, said means comprising means in the circuit of each phase and responsive to the voltage across that phase for drawing lagging substantially zero power factor current from that phase to compensate for voltage changes of that phase, the last said means comprising an individual detector in each phase for detecting voltage changes across that phase, a saturable reactor in each phase having an output winding shunted across that phase and also having a control winding for controlling the reactance of the reactor output winding in response to the detector in the phase shunted by that output winding.

3. A polyphase electrical system comprising an A.C. generator having a plurality of output phases, a plurality of circuits defining the respective output phases, and means for maintaining a desired ratio between the voltages of the respective phases under unbalanced load conditions, said means comprising means in the circuit of each phase and responsive to the voltage across that phase for drawing sufficient lagging zero power factor current in that phase to compensate for voltage changes of that phase, a major portion of said compensation being due to demagnetizing armature reaction caused by said lagging current, the last said means comprising an individual detector in each phase for detecting voltage changes in that phase, a reactor in each phase having an output winding shunted across that phase, and means for controlling the reactance of each reactor output winding in response to the detector in the phase shunted by that output winding.

References Cited in the file of this patent

UNITED STATES PATENTS

| 1,551,270 | Slepian | Aug. 25, 1925 |
| 1,654,948 | Thompson | Jan. 3, 1928 |
| 1,836,886 | Thompson | Dec. 15, 1931 |
| 2,610,991 | Levy | Sept. 16, 1952 |
| 2,821,679 | Robinson | Feb. 25, 1954 |

FOREIGN PATENTS

| 405,234 | Great Britain | Apr. 19, 1932 |

UNITED STATES PATENT OFFICE

CERTIFICATE OF CORRECTION

Patent No. 2,938,128                                            May 24, 1960

Frank G. Logan

It is hereby certified that error appears in the printed specification of the above numbered patent requiring correction and that the said Letters Patent should read as corrected below.

Column 3, line 40, for "operaing" read -- operating --; column 4, line 7, strike out "of"; line 9, strike out "control current from rectifier 52. Conversely, decrease"; same column 4, line 63, for "demagentizing" read -- demagnetizing --; column 6, line 71, list of References Cited, under UNITED STATES PATENTS, for "Robinson" read -- Robinson et al. --.

Signed and sealed this 15th day of November 1960.

(SEAL)
Attest:

KARL H. AXLINE
Attesting Officer

ROBERT C. WATSON
Commissioner of Patents